Figure 1:
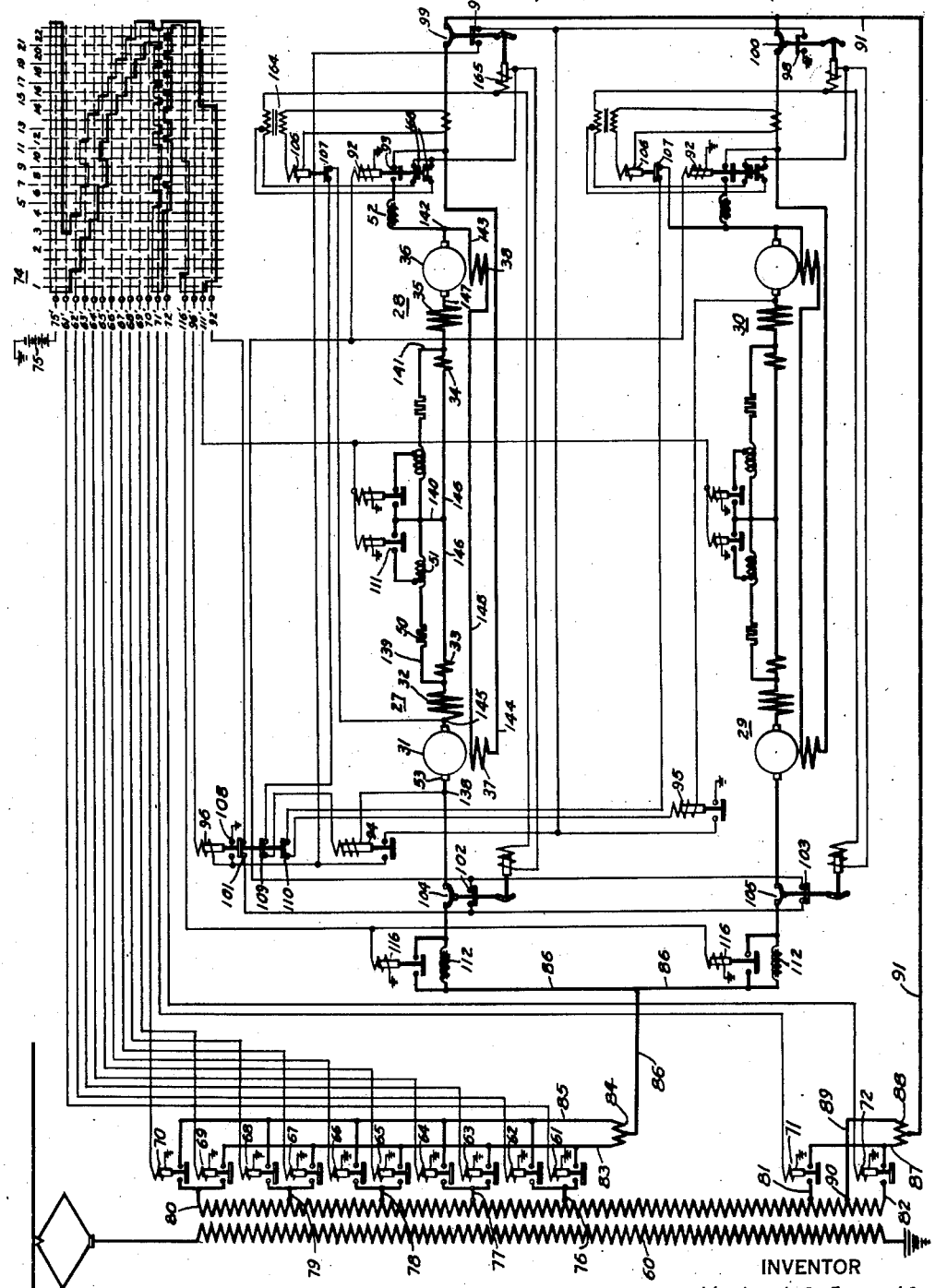

Aug. 15, 1933.　　　　H. G. JUNGK　　　　1,922,737
SINGLE PHASE SERIES RAILWAY MOTOR AND CONTROL SYSTEM THEREFOR
Filed Nov. 19, 1930　　　8 Sheets-Sheet 1

WITNESS
R. S. Williams

INVENTOR
Herbert G. Jungk.
BY Wesley G. Carr
ATTORNEY

Aug. 15, 1933.  H. G. JUNGK  1,922,737
SINGLE PHASE SERIES RAILWAY MOTOR AND CONTROL SYSTEM THEREFOR
Filed Nov. 19, 1930  8 Sheets-Sheet 2
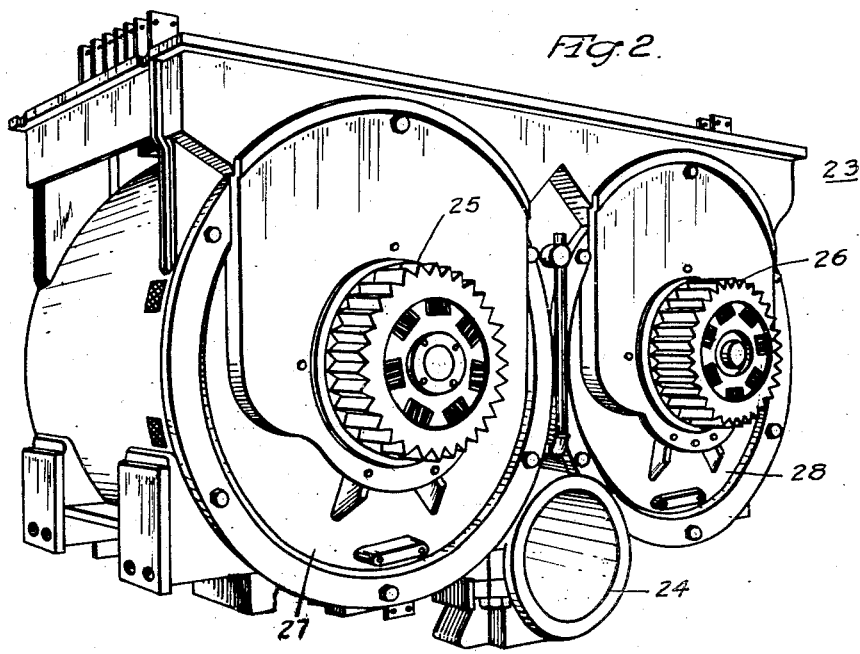
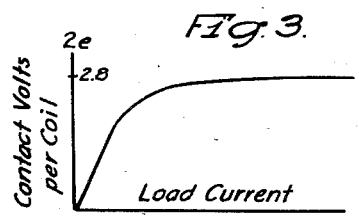
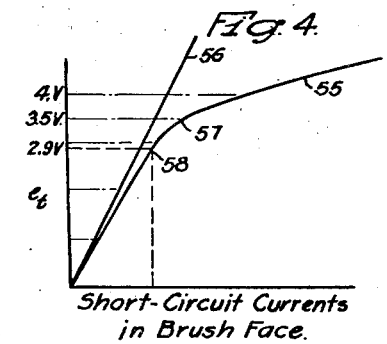
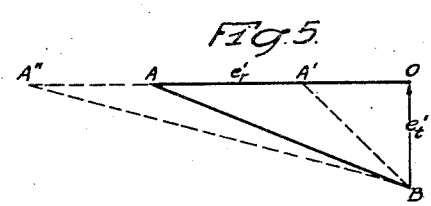
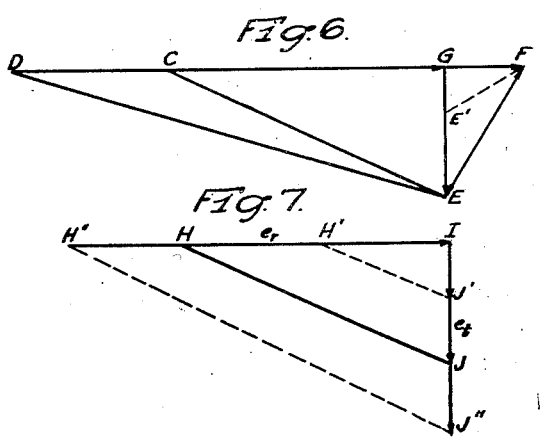
INVENTOR
Herbert G. Jungk.
BY
ATTORNEY
WITNESS

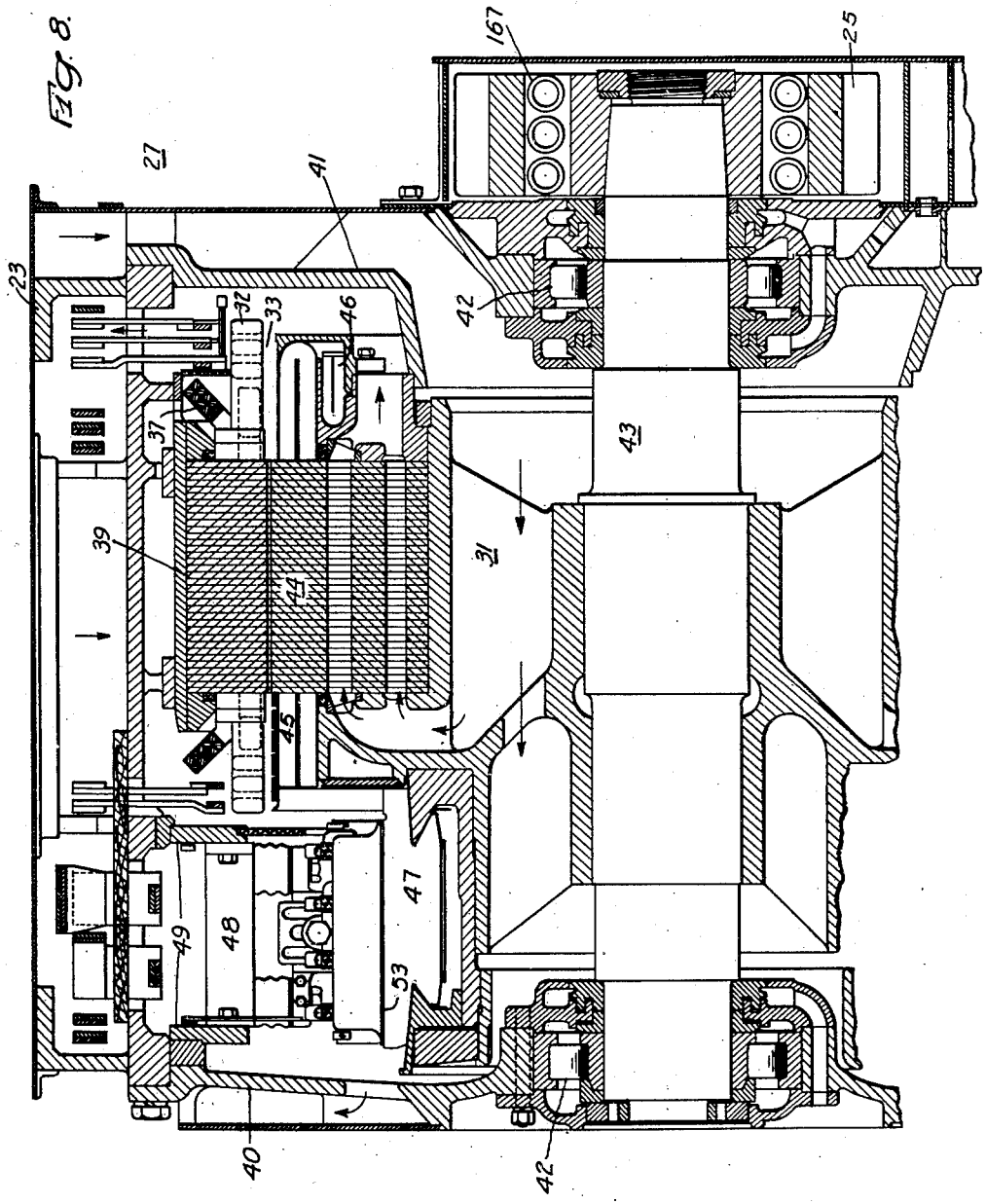

Aug. 15, 1933.   H. G. JUNGK   1,922,737
SINGLE PHASE SERIES RAILWAY MOTOR AND CONTROL SYSTEM THEREFOR
Filed Nov. 19, 1930   8 Sheets-Sheet 4
Fig. 9
| Step | \_\_\_Transformer_____Switches_____ | | | | | | | | | | | | O.C. | | | Step Volts |
|------|----|----|----|----|----|----|----|----|----|----|----|----|-----|-----|----|------|
|      | 61 | 62 | 63 | 64 | 65 | 66 | 67 | 68 | 69 | 70 | 71 | 72 | 116 | 111 | 92 |      |
| Off  |    |    |    |    |    |    |    |    |    |    |    |    |     |     |    |      |
| 1    | O  |    |    |    |    |    |    |    |    |    | O  |    | O   | O   |    | 195  |
| 2    | O  | O  |    |    |    |    |    |    |    |    | O  |    |     | O   | O  | 270  |
| 3    |    | O  | O  |    |    |    |    |    |    |    | O  |    |     | O   | O  | 318  |
| 4    |    |    | O  | O  |    |    |    |    |    |    | O  |    |     | O   | O  | 366  |
| 5    |    | O  | O  |    |    |    |    |    |    |    |    | O  |     | O   | O  | 397  |
| 6    |    | O  | O  |    |    |    |    |    |    |    |    | O  |     | O   | O  | 397  |
| 7    |    |    | O  |    |    |    |    |    |    |    | O  |    |     | O   | O  | 413  |
| 8    |    |    | O  |    |    |    |    |    |    |    |    | O  |     | O   | O  | 445  |
| 9    |    |    | O  |    |    |    |    |    |    |    |    | O  |     | O   | O  | 445  |
| 10   |    | O  | O  |    |    |    |    |    |    |    |    | O  | O   | O   | O  | 397  |
| 11   |    | O  | O  |    |    |    |    |    |    |    |    | O  | O   | O   | O  | 397  |
| 12   |    |    | O  | O  |    |    |    |    |    |    | O  |    | O   | O   | O  | 413  |
| 13   |    |    | O  | O  |    |    |    |    |    |    |    | O  | O   | O   | O  | 445  |
| 14   |    |    |    | O  | O  |    |    |    |    |    | O  |    | O   | O   | O  | 461  |
| 15   |    |    |    | O  | O  |    |    |    |    |    |    | O  | O   |     |    | 493  |
| 16   |    |    |    |    | O  | O  |    |    |    |    | O  |    | O   |     |    | 525  |
| 17   |    |    |    |    | O  | O  |    |    |    |    |    | O  | O   |     |    | 556  |
| 18   |    |    |    |    |    | O  | O  |    |    |    | O  |    | O   |     |    | 588  |
| 19   |    |    |    |    |    | O  | O  |    |    |    |    | O  | O   |     |    | 620  |
| 20   |    |    |    |    |    |    | O  | O  |    |    | O  |    | O   |     |    | 652  |
| 21   |    |    |    |    |    |    | O  | O  |    |    |    | O  | O   |     |    | 684  |
| 22   |    |    |    |    |    |    |    | O  | O  |    | O  |    | O   |     |    | 716  |
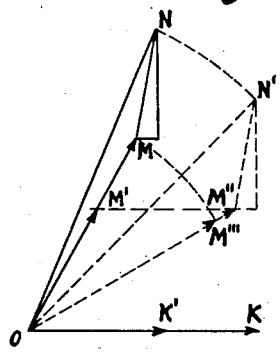
Fig. 10
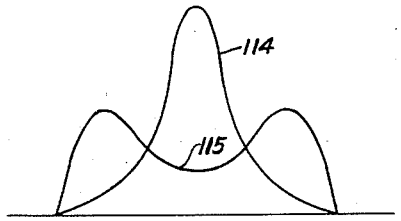
Fig. 11
WITNESS
Leon J. Jaya
INVENTOR
Herbert G. Jungk.
BY
ATTORNEY Current Speed Curves - Notching Range.

Zone for Good Commutation.

Aug. 15, 1933.  H. G. JUNGK  1,922,737
SINGLE PHASE SERIES RAILWAY MOTOR AND CONTROL SYSTEM THEREFOR
Filed Nov. 19, 1930  8 Sheets-Sheet 6

INVENTOR
Herbert G Jungk.
BY
ATTORNEY

Aug. 15, 1933.   H. G. JUNGK   1,922,737
SINGLE PHASE SERIES RAILWAY MOTOR AND CONTROL SYSTEM THEREFOR
Filed Nov. 19, 1930   8 Sheets-Sheet 7

WITNESS

INVENTOR
Herbert G. Jungk.
BY
ATTORNEY

Aug. 15, 1933.  H. G. JUNGK  1,922,737
SINGLE PHASE SERIES RAILWAY MOTOR AND CONTROL SYSTEM THEREFOR
Filed Nov. 19, 1930   8 Sheets-Sheet 8

INVENTOR
Herbert G. Jungk.
BY
ATTORNEY

WITNESSES:

Patented Aug. 15, 1933

1,922,737

UNITED STATES PATENT OFFICE 1,922,737

SINGLE-PHASE SERIES RAILWAY MOTOR AND CONTROL SYSTEM THEREFOR

Herbert G. Jungk, Wilkinsburg, Pa., assignor to Westinghouse Electric & Manufacturing Company, a Corporation of Pennsylvania Application November 19, 1930
Serial No. 496,800

26 Claims. (Cl. 172—276)

My invention relates to single-phase series railway motors and control systems therefor, and it has more particular relation to a railway locomotive although it is by no means limited thereto.

The object of my invention is to incorporate improvements in the motor and its control apparatus, or energizing means, said improvements involving a substantially different type of design. The significance of what I have done will be apparent when it is remarked that, some three years ago, when a proposed locomotive was laid out, for an important railway electrification project which is now in progress, the single-phase series motors which were then proposed and which were then considered to be a very significant advance of the previous art, were rated at 700 H. P. per driving-axle of the locomotive. This locomotive was not actually built because the improvements incorporated in my present invention began to be evolved, until we now obtain at least 1250 H.P. per driving-axle, with a consequent decrease in the number of driving wheels of the locomotive, thus saving enormously in the cost of the locomotive, while at the same time producing better and more reliable performance, a better over-all performance characteristic of the motor, black commutation for the first time in the history of this type of motor, and with all, less weight, less cost and a far greater reliability of action.

Figure 12:
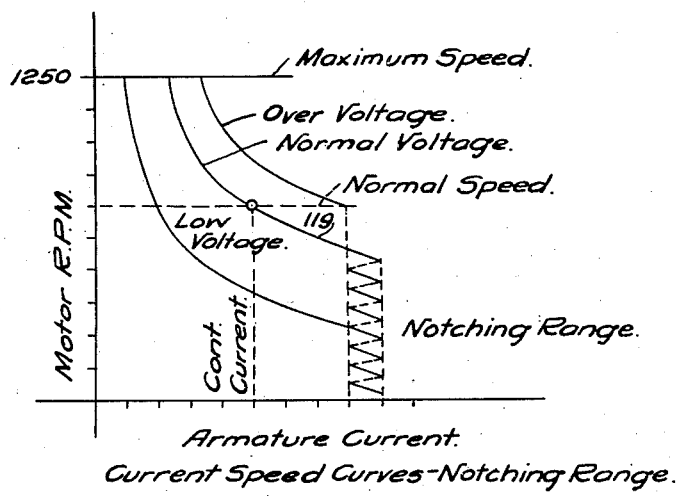
Figure 13:
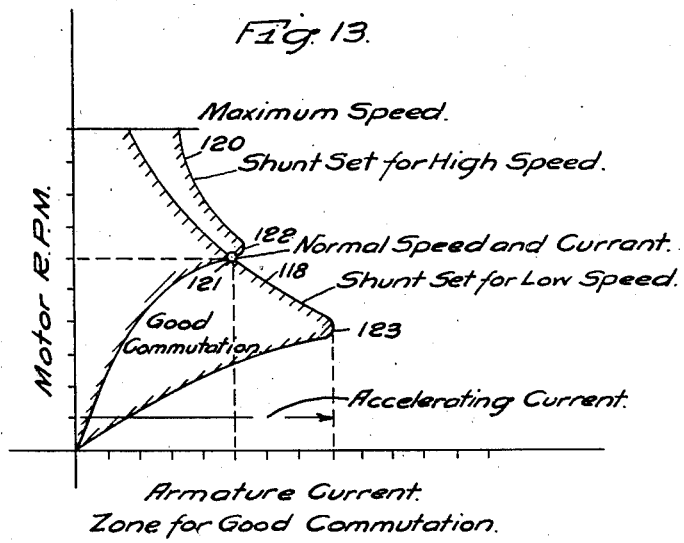
Figure 14:
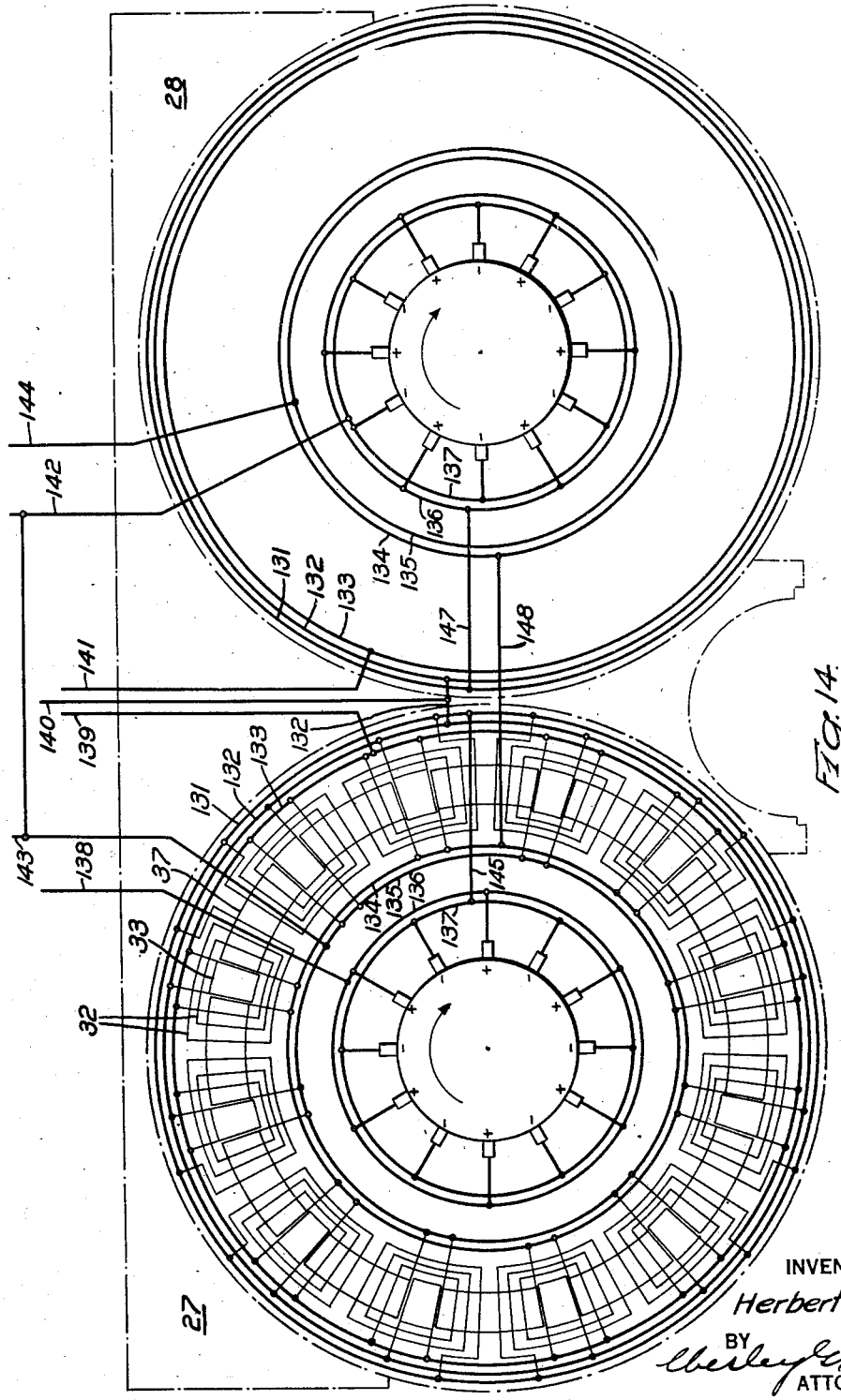
Figure 15:
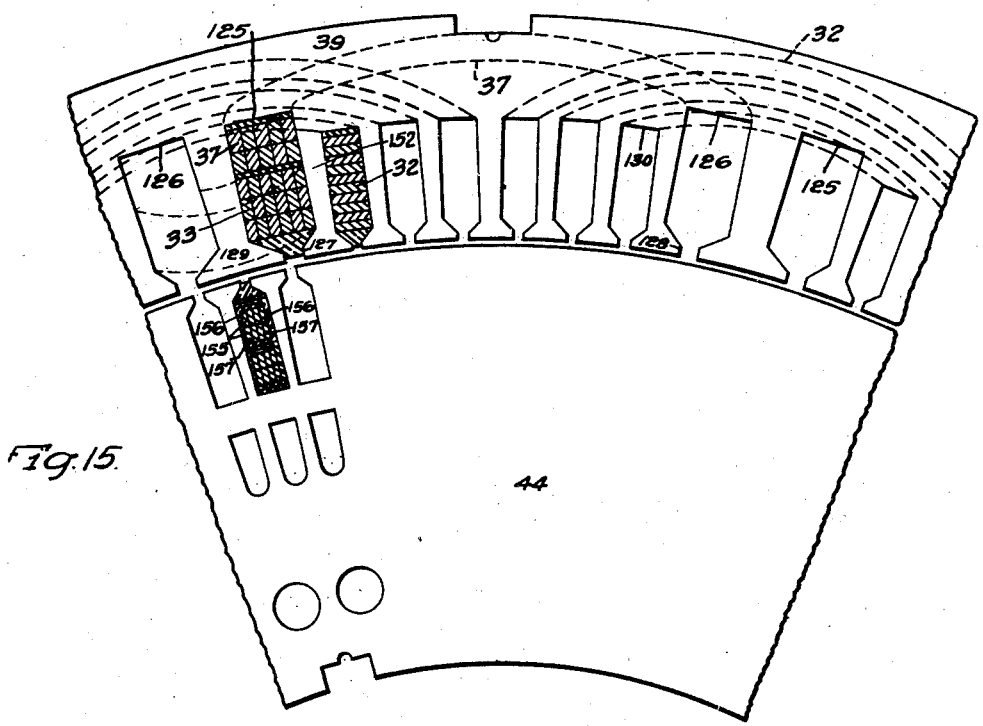
Figure 17:
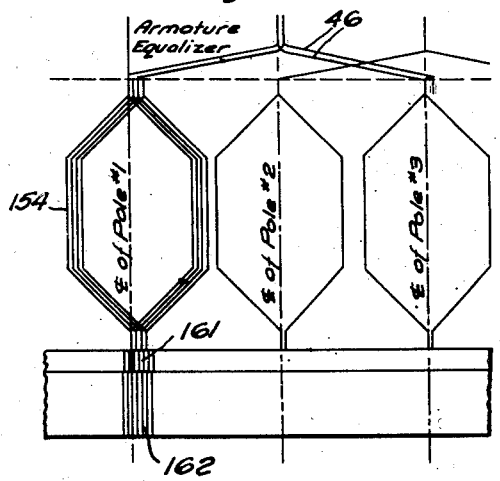
Figure 16:
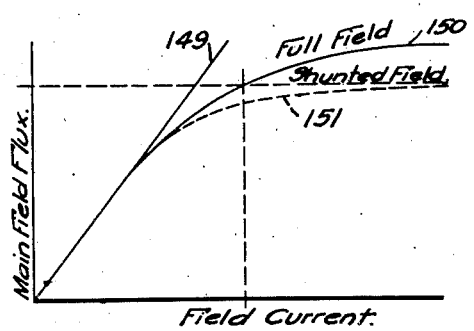
Figure 18:
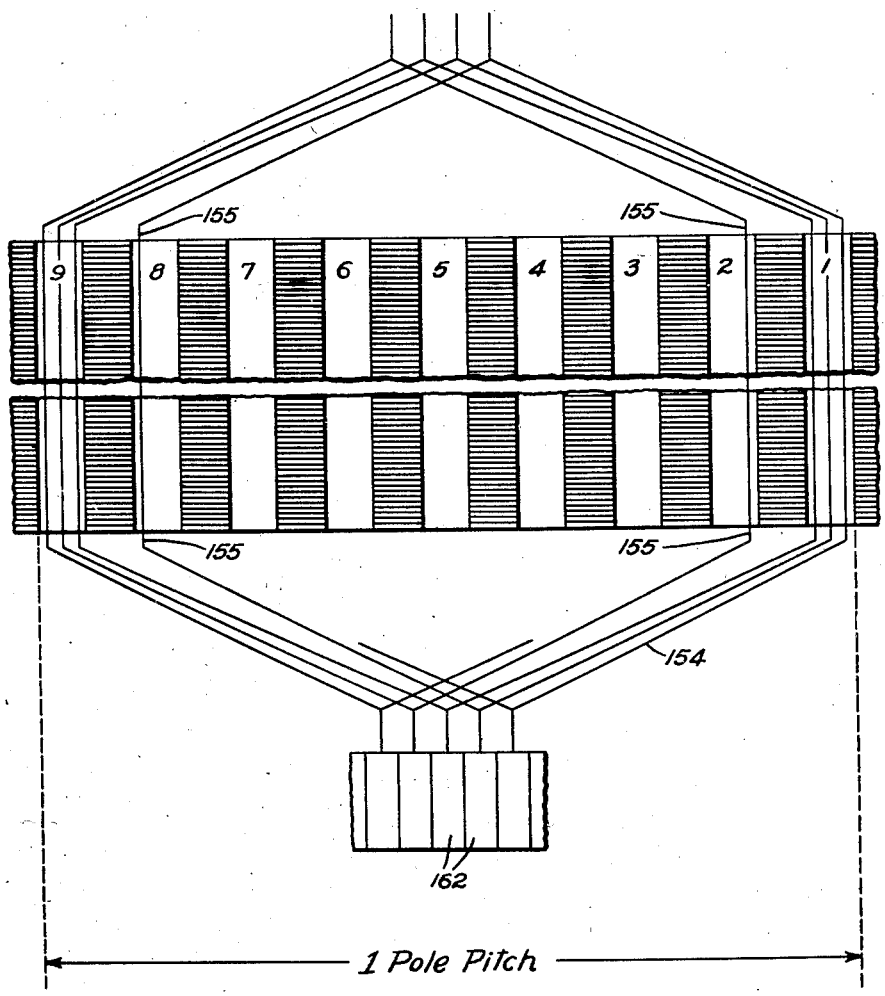

The novel features of my invention relate to the use of a low flux density while at the same time using a large air gap, in improvements in the inter-pole and main field shunts and in the control means therefor, the use of high-reactance, main transformers, and other improvements in both the motor design and structure and controlling and protecting apparatus therefor, as will be understood from the following description, in connection with the accompanying drawings, wherein Figure 1 is a general line diagram, Fig. 2 is a perspective view of the pinion end of one of my twin motors, Figs. 3 and 4 are curve diagrams illustrative of the brush performance, Figs. 5, 6 and 7 are vector diagrams referred to in the explanation of the interpole shunt, Fig. 8 is a longitudinal section view through one of my motors, Fig. 9 is a switching chart showing which switches are closed in the various positions of the master controller, Figs. 10 and 11 are vector and wave-form diagrams illustrative of the operation of the series reactor, Figs. 12 and 13 are curve diagrams illustrative of the operation of bringing the motor up to speed, Fig. 14 is a field wiring diagram, Fig. 15 is a view showing the stator and armature punchings, with some of the windings in place, Fig. 16 is a saturation curve of the motor, Fig. 17 is a diagram illustrative of the armature winding and cross connections therefor, and Fig. 18 is a more detailed diagram of an armature winding showing its disposition in the armature slots.

By way of example, I am showing my invention in a form in which it has been applied to a single-phase locomotive having two twin motors 23, as shown in Fig. 2, each mounted on an axle which passes through an axle bearing housing 24 and which is driven by pinions 25 and 26 on the ends of the shafts of the respective motors 27 and 28 of the twin units 23.

As shown in Fig. 1, there are four such motors, 27, 28, 29 and 30, constituting the two twin motors with twin motor units with which the locomotive is provided.

A description of one of the twin motor units will suffice for both. The motor 27, for example, comprises a commutator-type armature 31, a compensating winding 32 and an interpole winding 33 which are permanently connected together in series, in the order mentioned. Following through the series electrical connection, there next comes the interpole winding 34 of the other motor 28 of the twin, then the compensating winding 35 and the commutator-type armature 36 of the other motor 28. The two main or excited field windings 37 and 38 of the two motors, respectively, are permanently connected together in series and are connected in series with the armature 36.

The details of the twin motor frame 23 and other features of its construction, including the system of ventilation, are shown in a Bollinger application Serial No. 440,290, filed March 31, 1930 and also in a Bollinger Patent No. 1,752,364, granted April 1, 1930. Some of the salient features of the design are shown in Fig. 8, which is a longitudinal sectional view through one of the motors. The twin motor frame 23 houses the stator punchings 39 which carry the three stator windings, namely, the compensating or auxiliary winding 32, the interpole winding 33 and the field winding 37.

The motor frame, as further shown in Fig. 8, has end housings 40 and 41 carrying roller bearings 42 which support the shaft 43 of the armature, which is indicated in its entirety by the numeral 31. This armature member comprises armature punchings 44 carrying the armature winding 45 and equalizers or cross connections 46 (Figs. 8 and 17). The armature member also comprises a commutator 47 which is constructed as shown in a Moore application Serial No. 384,947, filed August 10, 1929, Patent No. 1,826,628, granted October 6, 1931. Assembled around the commutator are as many brushholders 48 as there are stator poles, said brushholders being mounted on brushholder rings 49, as set forth in a Bollinger application Serial No. 421,929, filed January 20, 1930, Patent No. 1,823,313, granted September 15, 1931.

Referring again to Fig. 1, it will be seen that each of the interpole windings 33 and 34 is provided with an interpole shunt comprising a resistance 50 and a reactance 51, and that the two main field windings 37 and 38 are provided with a single reactance shunt 52 around the two field windings. The functions and effects of these shunts and the general relations of fluxes, currents, speeds and commutator voltages will now be explained; in fact, these relations constitute some of the most important novel features whereby I have been enabled to secure the important results indicated at the outset of the specification.

It has been generally known in direct-current commutator motors that the field should be as strong as possible. A motor designer would not think of making a direct-current motor with a field weaker than the armature reaction, because he does not want the armature reaction to distort the field and because he wants all the flux possible.

Alternating-current commutator motors have heretofore been built also with a strong field flux, so as to reduce the magnitude of the armature currents which have to be handled by the commutator and the switching equipment. The air gaps of series single-phase motors have been made small, so as to enable the strong field flux to be induced without too many field ampere turns, and also so as to improve the power factor and (it was believed) the efficiency of such motors.

I have introduced this solution of the problem of designing series single-phase motors, involving a great many considerations, which I will endeavor to explain now.

One of the starting points of my design is the maximum sparking volts which can be tolerated in each short-circuited coil undergoing commutation under a brush, without producing serious sparking or burning up the brush, at starting. This value, in turn, depends a great deal upon the type of brush which is used. After much experimentation, I have determined some of the important characteristics which must be observed in the choice of the carbon brushes, which are indicated by the numeral 53 in Figs. 1 and 8. The brush must have a high contact drop, because I have found that the component of the sparking volts which is available at the brush contacts must not exceed the maximum contact drop characteristic of the brush. This is explained by reference to Fig. 3, wherein the double contact drop of the currents going in and out of the brushes is plotted against the load current. I use a brush having a relatively high contact drop, as compared to other brushes, said double contact drop approaching a steady value of about 2.8 volts at the highest load currents.

I have found that the brush must also be highly graphitized, that is, must be baked at a temperature high enough to graphitize the carbon. This enables the brush to stand very high temperatures, red to white hot, without material decomposition, except locally.

I have also found that the brush should have a low coefficient of friction, such as about .25, at a spring pressure of about 3.45 to 4 pounds per square inch of the brush area.

I have also found that the brush must have a low negative temperature coefficient in both its resistance and contact drop. This is illustrated in Fig. 4 in which curve 55 shows the short circuit currents in the brush face plotted against the so-called transformer sparking volts generated in the coil undergoing commutation. With a zero temperature coefficient, the brush would have a straight-line characteristic, as indicated at 56 in Fig. 4. With my brush, a sparking transformer voltage of 3½ volts between two adjacent commutator bars at standstill is the most that can be tolerated, as indicated by 57 on curve 55. The above condition holds only for circulating currents where the voltage generated in the coil is absorbed by the two contact drops, the internal resistance of the brush and the impedance drop of the short-circuited coil.

For the condition of both circulating current and load current in the brush the two currents add vectorially on one edge of the brush and subtract vectorially on the other side of the brush causing considerably more local heat in the brush face. This increases the temperature of the brush and lowers the resistance of the brush and contact surfaces thus bringing the critical point of the voltage-current curve below that for circulating currents only. For this reason, I have chosen 2.9 volts as a maximum safe voltage so as not to reach the critical point during starting conditions where both the circulating currents and load currents reach their highest values. I have found that when the load current density is brought up to 150 amperes per square inch, a transformer sparking voltage of 2.9 gives the maximum value of the product of these two factors, so that the combined heating of the two currents will not bring the brush temperature up to the critical point.

In starting, the brush carries not only the circulating currents resulting from the short circuiting of the coil undergoing commutation but also heavy starting currents as well, and the amount of circulating current that it can carry is reduced as the load current is increased. As a result of many tests, I have determined upon a maximum brush current density of a relatively high value, as compared to previous practice, using around 150 amperes per square inch of brush area as about the optimum design point around which to build the motor. This value holds for brush width of two or three commutator bar pitches, or any intermediate width, which is the range within which I work. This brush current density of 150 amperes per square inch is determined by dividing maximum start or accelerating current per brushholder by the total cross-sectional area of the brushes carried by each brushholder. With this value of brush current density, I have found that my brush can stand a sparking transformer voltage in the short-circuited coils, of only 2.9 volts per bar, and around this figure my whole design revolves. Previous designs have used a lower brush current density and have attempted to use brush sparking voltages of around 4.5 volts per bar and which was too high.

A transformer sparking voltage component of 2.9 volts per bar corresponds to 2.9÷1.11=2.6 megalines of flux per pole, at 25 cycles, or, in general, 75/$f$, or at any rate less than 80/$f$ megalines per pole, where $f$ is the frequency in cycles per second, thus limiting the number of turns on the main field poles to a value which will not send more than this much flux through the armature at the maximum starting or accelerating current. If I had attempted to utilize such a low flux in an ordinary design of a single-phase commutator motor, grave difficulties would have been involved by reason of the small number of field turns, as compared to the armature turns or armature reaction. The significant thing about my novel design is that I use a low flux of about 2.6 megalines or less in a 25 cycle motor, (or less than 2.8, as compared with previous high-flux series single phase motors, in which the flux range was of the order of 4 to 6 megalines per pole) at 25 cycles, and at the same time I use an air gap larger than .12 inch. In the particular motor illustrated in the drawings, I use an air gap of .138 inch. My next design will be .150 inch and after that I expect to try .160 inch and even higher air gaps, until a limit is reached, as the experience which I have gained with my new design indicates that my air gap is not yet as great as it really ought to be.

The significance of using a high air gap with a low flux density is that the large air gap counteracts the effect of the low flux density in tending to produce a weak field ampere turns, as compared to the armature reaction. Further, I have found that a great deal more depends on this ratio than has previously been apparent or understood. This may be explained as follows.

The motor must be built, of course, to deliver a certain specified gross tractive effort at start. This tractive effort, in pounds, is equal to a constant 1/1414 (which involves the ratio of feet per minute, miles per hour, and other constants) times the maximum flux per pole at start (that is the maximum time-value of an equivalent sine wave of flux which, in my design, is 2.6 megalines or less) times the brush current density (which, in my design, is 150 amperes per square inch) times the number of bars per brush (which, in my design, is between 2 and 3) times the active length of the commutator, (or the total axial length of the brush area) times the number of poles (which, in the particular motor shown in the drawings, is 12, but which has been figured out for all pole combinations between 12 and 20, which seems to be about the range of variation which is possible with my design) times the ratio of peripheral commutator speed to miles per hour of the locomotive, (the peripheral commutator speed being 9000 feet per minute, although I contemplate higher speeds of 10,000 feet per minute or more, thanks to Mr. Moore's commutator invention previously referred to, and improvements in balance, and the maximum speed of the locomotive being 90 miles per hour, with a gear ratio of 31:91 and a wheel diameter of 6 feet) times cos A (where the angle A is the displacement of the field flux relative to the armature current caused by the short circuiting of the armature conductors). This effect of the armature reaction in displacing the field flux becomes less and less as the number of ampere turns on the field is increased, that is, as the length of the air gap is increased. In other words, cos A approaches unity as the square of the ratio of field turns to the armature approaches infinity. I must, therefore, have a strong field but a weak flux, which means a large air gap. The future alternating-current commutator motor will, therefore, have bigger and bigger air gaps, with cos A varying from 80% to 100%. Thus, in the motor which I have illustrated, with an air gap of 1.38, 10 turns on the field and 39 effective turns on the armature, I lose about 20% in torque by reason of the displacement A of the field flux due to the reaction of the short-circuited current in the coils undergoing commutation. With the field turns increased to 14 and the armature turns reduced to 23, the corresponding loss in torque would be only about 5% to 10%. This is a new design principle which has not been used before, and which is characteristic of my low-flux motor.

The novel control of my interpole shunt 50, 51 is an important development in the art, contributing materially to the success of my motor, or even vitally necessary to the success of my motor. The reason for utilizing an interpole shunt will be apparent from a consideration of the sparking voltages which are produced in a coil undergoing commutation.

Referring to Fig. 5, the line OA represents what I call the inherent sparking voltage $e_r'$ which occurs as the current is transferred from one coil to the next one passing under the brush. This is substantially in phase opposition to the armature current and is proportional to the rate of change, or to the speed. Thus, the line OA represents the conditions at normal speed and normal current, the shorter line OA' represents the conditions for low speed and normal current, and the longer line OA'' represents the conditions for high speed and normal current.

In addition to the inherent sparking voltage or component in phase opposition to the armature current, there is another sparking or voltage component which is induced in each short circuited coil undergoing commutation by the transformer action of the main field flux threading through this coil. I call this component the inherent transformer component $e_t'$ which is indicated in Fig. 5 by the line BO at right angles to OA. This component is dependent only on the strength of the main field flux, being independent of the speed. The total sparking voltage in the short circuited coil is, therefore, represented by the lines BA', BA and BA'', at successively increasing speeds.

To substantially overcome this sparking voltage is a function of the interpole winding 33. The flux conditions in the interpole axis are not determined solely by the interpole excitation but also by the armature reaction which is partially compensated for by the compensating winding 32, as will be more fully explained hereafter. There is always an uncompensated portion of the armature reaction which is not counteracted by the compensating winding 32, and this is indicated in Fig. 6 by the line CD. The interpole ampere turns must have a component DC which neutralizes this uncompensated remainder of the armature reaction in the interpole axis, and also an additional component CE which generates a rotational voltage in the short-circuited coil, to compensate for the sparking voltage BA. If the total armature current should flow in the interpole turns, it would produce a total ampere turns DF in phase with the armature current and in phase opposition to the armature reaction CD.

During the starting conditions, the interpole field is shunted by a pure resistance 50 except for a slight reactance which may be retained in order to make a final exact adjustment in the number of effective turns in the interpole, as will be subsequently explained. Ignoring this reactance in the interpole shunt, for the time being, the effect of the resistance shunt 50 will be to divert a current or equivalent ampere turns EF into the shunt resistance 50. The current or ampere turns flowing in the interpole winding 33 is therefore CE, substantially at right angles to EF.

The total ampere turns excitation in the interpole axis is therefore CE, and this may be divided into a component CG in phase with the armature current and the component GE at right angles thereto. The effect of these components CG and GE on the short circuited coils undergoing commutation is to induce a voltage therein as a result of the rotation of the short circuited coil in the interpole field. This voltage is not shown in Fig. 6 because said figure is directed solely to the current or flux conditions present. The voltage diagram, for the rotational corrective voltages, is given in Fig. 7, in which the voltage $e_r = HI$ is generated by the in-phase component CG of the interpole flux, and the voltage $e_t = IJ$ is generated by the component GE. These voltages are both proportional directly to the speed as indicated by the dotted lines H', J' and H", J" for low and high speed conditions, respectively.

It is apparent, therefore, that the voltage generated in the short circuited coil by the rotation of the coil in the interpole flux is given by $e_r = I_w \times$ a constant $\times$ R. P. M., where $I_w$ is the in-phase component CG of the effective interpole current. This generated voltage is designed to exactly neutralize, at all times, the inherent sparking voltage which is given by the equation $e_r' = I_a \times$ a constant $\times$ R. P. M., where $I_a$ is the total armature current. As $I_w$ is proportional to $I_a$ it is possible to satisfy this equality $e_r = e_r'$ at all times, and this is done in my motor.

It will be noted, however, that the volts generated in the short circuited coil by the rotation of the latter in the interpole flux is proportional to the speed, as indicated by the equation $e_t = I_t \times$ a constant $\times$ R. P. M., where $I_t$ is the component GE of the effective interpole current. On the other hand, the transformer sparking voltage $e_t'$, which should be neutralized, is equal to the constant times the main or exciting flux which is a function of the armature current $I_a$, being independent of the speed. It is impossible, therefore, with a single interpole shunt setting, to exactly compensate the transformer sparking voltage $e_t'$ at all speeds. In fact, it is impossible to compensate this component at all at first starting or standstill, and this is the reason why I designed my motor around a low sparking voltage of 2.9 volts.

According to my invention, therefore, the inherent sparking voltage $e_r'$ is always substantially exactly compensated by the rotational voltage generated in the short circuited coil, but the transformer sparking voltage $e_t'$ is either under or over compensated, in general, care being taken that the algebraic sum of $e_t$, $e_t'$ shall not exceed 2.9 volts at any speed.

In order to improve the commutating conditions as much as possible during the low speed operation while accelerating the motor, the quarter phase exciting component GE of the interpole ampere turns is made as large as possible. At high speeds, when the product of this component times speed would produce more than 2.9 volts in excess of the original 2.9 transformer volts to be compensated for, it is desirable, at high speeds, to reduce this component GE to some value such as GE', which can be done by adding a reactance 51 to the interpole shunt, the shunt resistance 50 being maintained unaltered, so that the compensation of the inherent sparking voltage $e_r'$ will not be deleteriously affected.

I prefer to use air core reactances 51 in the interpole shunt, so as to have a constant reactance, without any saturation effect, and no iron core losses which would be equivalent to an added resistance. Experiments which I made with iron core reactances showed that the equivalent resistance went up and the reactance went down as the currents decreased, which was contrary to first expectations. I use an air core reactance and a non-inductive resistance in order to get an accurate shunt which maintains its resistance.

In the foregoing explanation, it has been shown that the design of my motor is built up around a low flux per pole in the main field, so as to get a transformer sparking voltage of less than 2.9 at starting. However, the maximum starting or accelerating current is at least two times the normal current, the continuous rating current at the so-called normal speed, which is 60% of the maximum speed. This normal rating is the arbitrary speed at which the H. P., tractive effort, etc. are figured. Since the running currents, therefore, are considerably smaller than the starting currents, and since the motor is a series motor, the main field flux would be uneconomically and unnecessarily weak during running conditions if something were not done to increase this flux. I prefer to utilize a number of turns on the main field winding which will give about the same flux per pole at normal current as has previously been indicated for the conditions with the maximum starting or accelerating current, or $70/f$ megalines per pole, where $f$ is the frequency in cycles per second. Some means must be resorted to for reducing the main field flux to this value during the heavy starting currents.

By way of illustration, I have shown in the drawings the device which I am at present using, comprising the main field shunt 52 previously referred to. This shunt is an iron core reactor, preferably having a saturation curve which is flatter than the main field winding, so that as the armature currents increase, the proportion of current shunted off by the reactor will also increase, thereby weakening the field.

If the voltage-current curves of the main field and the main field shunt cross each other at approximately the operating point corresponding to the normal current of the motor, the field and shunt currents being expressed as certain percentages of the current at this condition, it is possible to design the motor so that it is not necessary to cut out the shunt when the normal speed is reached. At present I prefer, however, to cut out the main field shunt 52 at about 25% of the maximum speed of 90 miles per hour or about 20 to 30 miles per hour.

Reference will now be made to Fig. 1 for a consideration of the main control circuits of a passenger locomotive utilizing two of my twin motors, or four motors. Power is supplied from a single phase transformer 60 which is associated with a number of tap-changing contactors, or electromagnetic switches 61 to 72, the coils of which are energized by wires 61' to 72', respectively, leading to a master controller 74, having 22 operating positions as indicated. Power for operating the various electromagnetic switches is supplied to the master controller from any suitable source, such as a battery 75, the negative terminal of which is grounded and the positive terminal of which is connected, by wire 75, to the master controller.

The contacts of the main transformer switches 61 to 70 are connected, in pairs, to five taps 76 to 80, respectively, on the secondary winding of the main transformer 60. The contacts of the two transformer switches 71 and 72 are connected to two taps 81 and 82 at the other end of the transformer secondary winding. Alternate switches 61, 63, 65, 67 and 69 are connected to a bus 83 and to one end of a preventive coil 84, the other end of which is connected to a bus 85 in circuit with the contacts of the other five switches 62, 64, 66, 68 and 70. The mid point of the preventive coil 84 is connected to a conductor 86 which carries current to the four motors which are connected in two parallel circuits, each twin motor being in a single circuit with its two motors connected in series.

The two contacts of the transformer switches 81 and 82 are both connected to a bus 87 which is connected to one end of a second preventive coil 88, the other end of which is connected by a lead 89 to a tap 90 midway between the taps 81 and 82. The mid point of the preventive coil 88 is joined to a return conductor 91 which completes the circuits of the motors.

Each twin motor is provided with a field switch, or electromagnetic contactor 92, the coil of which is energized by a conductor 92' leading from the master controller. Each field switch 92 is provided with main contacts 93 which are in series with the main field shunt 52 so that this shunt is connected in parallel to the two main field windings 37 and 38 whenever the field switch 92 is energized.

As previously explained, it is desirable to cut out this main field shunt 52 at a certain speed, and I have shown as the most convenient means for responding to the speed, a voltage relay 94, the coil of which is responsive to the armature voltage of the motor 27, and a second voltage relay 95, the coil of which is responsive to the armature voltage of the motor 30 of the other twin unit.

In order to relieve the duty, or number of contacts necessary to be carried by the two voltage relays 94 and 95, I provide an auxiliary relay 96, the actuating coil of which is connected to a lead 96' which is energized in all positions of the master controller 74 except the off position. The circuit of the energizing coil of the auxiliary relay 96 is completed only when both of the voltage relays 94 and 95 are energized, which occurs at a critical armature voltage of 42 volts corresponding to the desired critical speed. If either of the twin motor units is cut out, its corresponding voltage switch 94 or 95 will be simultaneously short circuited, by means of back contacts 97 or 98 on the motor circuit breakers 99 and 100, respectively.

The auxiliary relay 96 has normally closed contacts 101 which are connected in series with the lead line 92' of the field relays 92, provided that either one of the twin motor circuits is closed, the latter condition being assured by auxiliary contacts 102 and 103 on two other circuit breakers 104 and 105 in the respective motor circuits.

The field relays are energized, therefore, only when the auxiliary relay 96 is deenergized and when either the circuit breaker 104 or 105, or both are closed. When the field relays 92 are energized, their respective main field shunts 52 are connected in parallel to the main field windings 37 and 38.

As it is not desirable to remove the shunts on the main field when the armature current is very excessive, as when starting up under a moderately heavy load, even though the armature voltage should exceed the predetermined amount of 42 volts, it is desirable to introduce some means for preventing the opening of the main field shunts at all times when the armature current exceeds a certain predetermined amount, which is dictated more or less by experience or performance ability of the particular motor in question. To this end, I have introduced a current relay 106 having a normally closed contact 107 in series with each of the voltage coils 94 and 95, respectively, said current relays responding to the motor current and opening their contacts only when the current exceeds the aforesaid predetermined amount. Thus, the voltage relays 94 are prevented from closing whenever the current is excessive, even though the armature voltage or speed should be sufficient of itself to energize the voltage coils 94 or 95. It is only when the armature voltage is higher than a predetermined amount and the armature current is lower than a predetermined amount that the voltage relays 94 and 95 will operate to close their contacts and to complete the circuit of the auxiliary relay 96, thereby opening its contacts 101 and deenergizing the field relays 92, thus removing the main field shunts 52.

As soon as the auxiliary relay 96 is energized, it closes auxiliary holding contacts 108 which prevent the subsequent opening of the relay. This is necessary because the introduction of the full field strength will produce an increase in the current which, in turn, would open the contacts 107 of the current relays 106, thereby producing a chattering operation if some such holding contact as contacts 108 were not provided. For a similar purpose, the auxiliary relay 96 is provided with two normally closed contacts 109 and 110 which are connected in series with the respective energizing coils of the two voltage relays 94 and 95, thereby not only preventing chattering of the latter, but permanently disconnecting them from circuit when the auxiliary relay has once been actuated, this condition being maintained until the master controller is again moved to its off position.

Each of the four reactive interpole shunts 51 is provided with a short circuiting relay or electro-magnetic switch 111, the actuating coil of which is energized by a conductor 111' connecting from the master controller 74. These interpole shunt relays 111 could be controlled in a manner similar to that which has just been described for the field shunt relays 92, but I have found it sufficient for my present motor to energize these interpole relays 111, thus short circuiting most of the reactive part of the interpole shunts, whenever the master controller is on a notch lower than the fifteenth, or some other predetermined notch corresponding to a certain applied voltage which is tapped off from the main transformer 60. As long as the applied voltage is not yet this predetermined amount, it has not been found necessary to disturb the original interpole shunt setting which was adjusted for the accelerating conditions.

The master controller 74 is provided with a movable contact cylinder which is so shaped as to energize the various lead lines which come out from the controller in a manner which will be evident from Fig. 1, and which is also summarized in Fig. 9, which shows by means of small circles, the switches which are energized at different positions of the master controller, and which also shows the open-circuit voltage which is tapped off from the main transformer 60, at each position of the master controller. It will be noted that the field shunt relays 92 are deenergized whenever the applied open-circuit voltage exceeds 461 volts, corresponding to the fourteenth notch of the master controller, regardless of the speed and current conditions. In actual practice, however, the field shunt switches 92 are ordinarily deenergized before the fourteenth notch is reached. It is also noted that the field shunt relays 92 are not energized on the first notch of the master controller, which means that the motor is started on full field if it is capable of starting on the first notch with extremely low applied voltage. Ordinarily, this will occur only in case of a locomotive running light. When hauling a train, the locomotive engineer must notch the controller on up for several steps until the locomotive starts.

It will be perceived that the control of the speed and acceleration of the locomotive is simply and economically effected by means of variable taps on the main transformer.

I have found it extremely desirable to supplement this variable tap control by an additional means which will give the effect of an infinite number of applied voltages, varying automatically with the speed of the locomotive, so that, when the locomotive is once started on any one of the notches, say notch four, for example, it will pick up considerable speed on that notch, before requiring to be notched up to the next voltage step. This function is accomplished by means of a series reactor 112 in series with each of the twin motor circuits. I prefer to make this reactor a highly saturated, iron-core reactor, saturated so as not to take too much voltage drop at the high starting currents. I utilize a reactor taking about 120 volts, or 60 volts per armature, which amounts to some 25% or 30% of the normal voltage of the machine during the accelerating conditions. The saturation of the reactor iron also prevents the series reactance from varying too much with different currents.

The effect of the series reactance in automatically increasing the motor volts as the speed increases is illustrated in Fig. 10, in which the initial rush of current necessary to start the motor is indicated at OK corresponding to a reactance drop of MO and a series reactance drop of NM, so that the impressed voltage, impressed from the terminals of the transformer, is ON. As the motor picks up speed, the armature current reduces to OK', the motor impedance drop reduces to M'O and an additional counter E. M. F. M"M' is added which is substantially in phase opposition to the armature current, so that the resultant of voltage which must be impressed on the motor terminals is OM". The series reactance drop remains about the same, at N'M", so that the impressed voltage for this new condition is ON', which is seen to be of the same magnitude as the originally impressed voltage of ON. It will be seen that, at standstill, the series reactor voltage was almost in phase with the motor voltage, so that it subtracted almost directly from the impressed voltage to reduce the applied motor voltage to OM, whereas, when a certain speed had been attained, the motor power factor improved, with the result that the reactor voltage became more nearly at right angles to the motor voltage, so that the impressed voltage was not as greatly reduced, thereby increasing the motor voltage by an amount M'''M''. This diagram has been plotted as if the armature currents remained unchanged in phase position, showing the relative change in phase between the voltage and currents, although, as a matter of fact, the voltages remain substantially unchanged while the armature currents change both in phase and magnitude.

By this automatic voltage-regulating action of the series reactor, it results that the voltage available for the motor gradually increases until the speed has increased from zero to perhaps 30 or 40% of the running speed without a change in control. This makes a very smooth acceleration, and is especially valuable in handling a train. The slight decrease in the locomotive power factor is negligible because the series reactor is used only in the brief starting periods.

The use of a series reactor also improves the sparking conditions at the commutator because it softens the initial current rush. Any sudden variation in current, in a commutator machine, will produce sparking, and hence this effect of the series reactor in reducing the suddenness of the current change is of real importance from the standpoint of commutation.

The series reactor also reduces the third harmonic of voltage which otherwise appears in the voltage wave of the motor, as indicated by the curve 114 in Fig. 11, the effect of the third harmonic being to distort the sine wave so that its peak value is raised. This effect of the series reactor in reducing the third harmonic is more pronounced when the series reactor is saturated than when it is unsaturated. The effect being to flatten out the voltage wave, or even to render it concave on top, as indicated at 115 in Fig. 11, which is perhaps an extreme case. This tends to reduce the maximum value of the flux, thus holding the sparking volts well below the critical value, or maximum tolerable value, of 2.9 volts per coil.

The harmonics, in general, have a deleterious effect on commutation, the cure for which is too little understood. This series reactor is one effective way for reducing these harmful harmonic reactions on the commutation of the motor. Other means, such as rounding the pole tips, increasing the air gap, etc., are also useful in this respect. The harmonics are to be avoided, also, because of possible inductive interference with nearby communication lines.

Reference to Figs. 1 and 9 will show that the series reactors 112 are cut out, by means of relays 116 and the control wire 116', between the 9th and 10th steps of the master controller. At the same time, the applied voltage is slightly reduced, so that the increase in the motor voltage will not be too great.

It will also be noted that the series reactors are short circuited on the circuit at the first operating point of the master controller. This is because, on the particular design illustrated in the drawings, the first voltage step of the transformer was not quite high enough to send the necessary starting current through the motor. As the voltage was extremely low, and as this step of the transformer is used only for the locomotive running light, the above described advantages of the series reactor were not needed.

Even on step one of the master controller, however, the advantages of a series reactor were not altogether lost because the main transformer is built with an unusually high leakage reactance as compared to usual transformer practice for ordinary power purposes. My transformer has a 7% reactance, or between 6% and 9% reactance, as against 3% to 5% reactance in a normal industrial transformer based on the continuous current rating of the transformer. The transformer itself, therefore, has the effect of a series reactance, thus not only improving the performance of the motors, but making the transformer lighter and much lower in cost.

The manner of bringing the motor up to speed is illustrated in Fig. 12, wherein the motor R. P. M. is plotted against the armature current for a typical load condition. The notching range, continuous current, normal speed and maximum speed are all indicated in the figure. For each applied voltage, there is a typical speed-current curve, three complete curves being shown, one for the normal voltage giving the continuous rated current at the normal speed and two others for an overvoltage and a low voltage, respectively.

Fig. 13 shows the speed and current conditions under which good commutation may be obtained, for each of the two settings of the interpole shunt. For the starting condition, with practically all of the shunt reactance 51 short-circuited out, the conditions of the shunt are so chosen that the upper curve of the good-commutation envelope or zone 118 coincides practically with the normal-voltage speed-current curve 119 of Fig. 12, that is, so that the point of maximum armature current which may be utilized, with good-commutating conditions, occurs at approximately the highest accelerating voltage. For high speed, it is desirable to have a different setting of the interpole shunt, producing a different set of conditions in which the good-commutating zone or envelope is indicated by the curve 120 in Fig. 13, and it is desirable to have the lower curve of this second envelope pass through the continuous rating point 121, as well as the upper curve of the first envelope 118. Since less current will be required in the armature at the higher speeds, I set the shunt for a lower maximum current 122 than the maximum current 123 which may be obtained with good commutation with the first shunt setting.

For the lower current conditions obtaining at speeds higher than the normal speed point 121 in Fig. 13, the interpole magnetic circuit will not be saturated as much as on the low speed setting. The components in phase with the armature current may be somewhat less in percent of the armature current, due to less saturation. The quadrature current must be made lower in proportion than for the low speed setting because, with the lower currents in the field coils, the field flux will be less and, therefore, the transformer voltage induced in the short circuited coils by the main field flux will be less over the operating range of the motor. Likewise, since the motor will operate on higher speeds, I do not require as much quadrature flux in the interpole in order to generate a voltage at right angles to the armature current and equal and opposite to the induced or inherent transformer sparking voltage.

When the values of the resistance and reactance of the interpole shunt settings are chosen, allowance must be made for the variation in the interpole saturation, as explained in the preceding paragraph.

It will be noted from Fig. 1 that not quite all of the shunt reactance 51 of the interpole shunt is shorted out by the relay 111, thus leaving a very small amount of reactance in series with the shunt resistance 50 at starting. The object of this is to produce exactly the right number of effective turns in the interpole winding during the starting conditions. Experience has shown that there is a certain amount of discrepancy between calculated and actual results of magnetic circuits and also a certain discrepancy in the magnetic circuits of different individual motors, and it is more convenient in design to provide a very slight excess in the interpole turns in order to make sure there is not a deficiency, because it is easier to reduce the interpole ampere turns by means of a shunting reactance than it is to increase the same by means of a shunt capacitance.

Fig. 14 is a diagrammatic view showing the field windings and the field and armature connections, with the outline of a twin motor frame indicated in dot and dash lines. The stator winding details are omitted on the right-hand motor as they are merely a duplicate of the windings shown in the left-hand motor. The arrangement of the slots and the disposition of the windings therein, for both the stator punchings 39 and the rotor punchings 44, are shown in Fig. 15.

The stator punchings 39 are provided with twelve pairs of large slots 125, 126, in the bottoms of which are disposed the main or exciting field windings 37. These large slots 125 and 126 define the main poles, extending between the points 127 and 128. Between two adjacent large slots 126 and 125 at 90 electrical spaced degrees from the main field winding 37 is wound the interpole winding 33, occupying the tops of the large slots or the portions nearest the air gap. The single large tooth 129 between these two large slots 126 and 125 constitutes the interpole. The faces of the main poles, between the points 127 and 128, are cut up by a number of smaller slots 130 in which lie the concentric coils of the compensating winding 32.

Referring now to Fig. 14, it will be seen that the various stator field windings and the commutating brush circuits of the armature are connected to seven rings 131 to 137. Each twin motor is provided with seven terminals 138 to 144. Current is led into the so-called plus armature terminal 138 of the left-hand motor 27 and thence into the ring 136 which is connected to the brushes marked plus, although it is to be remembered that we are dealing with alternating currents, the plus and minus signs indicating merely the flow of current at any particular moment. Current leaves the armature by the minus brushes which are connected to the ring 137 which is permanently connected by conductor 145 to the outer ring 131. The twelve concentric compensating windings are connected in parallel between the rings 131 and 133 and the ring 133 is connected to the second motor terminal marked 139 which is provided for connection to the resistance grid 50 of the interpole shunt, as indicated in Fig. 1. Between the rings 133 and 132 are connected the concentrated interpole windings 33, and the rings 132 of the two motors 27 and 28 are permanently connected together by a conductor 132 which is also connected to the motor terminal 140 which provides one of the terminals of the interpole shunt, as indicated in Fig. 1. The circuit then continues, in the right-hand motor 28, between the rings 132 and 133 of the latter, which energize the interpole windings of this motor and then between the rings 133 and 131 which energize the compensating windings of this motor and thence by conductor 147 to the plus armature ring 136, thence through the armature to the minus armature ring 137 and to the so-called minus armature motor terminal 132. The motor terminal 141 is connected to the ring 133 of the right-hand motor, for the interpole shunt of this motor.

The so-called positive field terminal 143 of the twin motors is connected to the motor terminal 142 and also to the ring 135 of the left-hand motor 27. The twelve field windings 37 of the left-hand motor are connected in parallel between the rings 135 and 134. The rings 134 of the two motors are connected together by a lead 148, whence the circuit passes through the field windings of the right-hand motor 28 to the ring 135 of the latter and thence to the seventh motor terminal 144 of the twin motor unit.

The compensating winding ampere turns should be equal to, or should slightly exceed, the ampere turns of the armature reaction over the pole faces, or the portions of the periphery occupied by the compensating winding. Since the pole face does not exceed more than 65% to 75% of the total pole pitch, we cannot place more than 75% to 80% of the total required ampere turns in the compensating winding. The remaining 20% to 25% of the armature ampere turns must be supplied by the interpole winding as already explained. The main field winding and magnetic circuits of the motor must be designed so as to produce an extremely flat saturation curve, so as to keep down the main field flux during the flow of excessive starting currents. This means not only a rather highly saturated magnetic circuit for the main field flux, but usually auxiliary means, exemplified by my main field shunt, for still further reducing the maximum flux (or voltage) at the highest starting currents.

Fig. 16 may be referred to, for illustrating several of the effects involved in the magnetic circuit. The straight line 149 illustrates the flux which would be induced if there were no saturation. The curve 150 may be regarded as illustrating the saturation curve with the full field strength. The lower curve 151, which is substantially flat on top, may be regarded as the saturation curve with the shunted field.

Reference to Fig. 15 will show that my large slots 125 and 126 are partially closed, thus defining main-pole tips 127 and 128 which become saturated before any other part of the magnetic circuit, thus reducing the effective area of the iron. In like manner, the tooth 152 between each big slot and the adjacent small slot is also constructed with a carefully calculated restricted cross section so that those teeth 152 in which the magnetomotive forces of the main and compensating windings are cumulative will also become saturated, shortly after the pole tips, thus further reducing the effective cross section of the iron. The effects of these, let us say, premature saturations, is to cause the saturation curve to bend over in much the same manner that the main field shunt causes it to bend over, as has just been explained in Fig. 16 in connection with curve 150 and 151.

The laminations of my motor are made of a medium silicon steel having about 3% silicon content. This is a steel having only about 60% of the iron loss of the usual steels commonly used for punchings, particularly at the low flux densities which I use, which are not over about 130,000 C. G. S. lines per square inch, or at least no greater than 150,000 lines, referring to the maximum time values. The lower iron loss cuts down the local heating of the punchings, particularly in the teeth, which are the most saturated and which are close to the copper. The motor is cooled by forced ventilation, and most of the heat which is removed from the copper must be removed through the teeth. Hence, any reduction in the temperature of the teeth, by reducing the losses therein, has a direct and important effect upon the cooling of the copper, which is one of the limiting features of design, determining the size of the motor.

My punchings have a higher space factor than the punchings which are used by most manufacturers, that is, a higher percentage of the total space taken by the punchings is occupied by iron. This is brought about by the use of water glass insulation as described in the Gross Patent No. 1,750,305, granted March 11, 1930. In the particular motor illustrated in the drawings, I use powder alumina, or aluminum oxide, in the water glass.

It is essential to use a multiple-wound armature winding 154 with one turn between bars, and as many parallel paths as there are poles, as indicated diagrammatically in Figs. 17 and 18.

The armature winding is chorded so that the distance between the two coil sides of any coil is less than the pole pitch as shown in Figs. 17 and 18. The effect of this chording is to materially round off the peak of the curve showing the space-distribution of the armature ampere turns or armature reaction, thus materially facilitating commutation.

The armature winding must also have a split throw or fractional pitch, as set forth in the Hellmund Patent No. 1,298,705, granted April 1, 1919. According to this winding system, all of the conductors on one side of the coil may be placed in one slot, but on the other side of the coil one of the conductors should be placed in a slot adjacent to the one in which the remainder of the conductors are, as shown by the conductor 155 in Fig. 18. The advantage of this split throw or fractional pitch is that the time during which the current in the coil is being commutated is lengthened, and furthermore, the leakage flux which undergoes a change in direction during the commutation period is distributed over several teeth so that the commutated conductor is cut by less flux, and during a longer period of time than would otherwise be obtained.

The currents in the various portions of the armature must be more thoroughly equalized than is common in most previous designs. For this purpose, the armature winding must have at least one cross connection per slot and more if possible. In Figs. 15 and 17, it will be seen that there are four coils or eight coil-sides per slot. In Fig. 15 it is shown that each coil side is split into two conductors 156 and 157, which are separately taped to reduce eddy current losses, but which are joined together at the ends in a known manner.

Referring again to Fig. 17, it will be noted that, in the particular motor illustrated in the drawings, I am using two cross connections 46 per slot, or one cross connection for every other armature coil.

Performing the same function as the cross connections, in equalizing the armature currents is the parallel connection of the several field windings, which has previously been described in connection with Fig. 14. It is important, therefore, that these parallel field winding connections be utilized, instead of putting the field windings for all of the poles in series.

The design of my motor is an intricately balanced problem involving many factors which must all be used together in order to produce the desired result. Thus the space factor of the iron or of the coils in the slot cannot be changed without affecting the whole saturation curve. The inter-relation between the tooth, temperature and the cooling of the copper has already been pointed out. Intimately bearing on this same problem is the thickness of the insulation on the windings. It has been necessary to develop a new type in order to secure a sufficiently thin, reliable taped insulation. To this end, I utilize the thin, cloth-backed mica tape which constitutes the subject-matter of an application Serial No. 551,372, of B. V. McBride, filed July 17, 1931, consisting of .001 inch tissue paper, mica splittings, and a specially developed, starch-sized, highly calendered .002 inch cotton cloth having long-fibre threads, the three layers being held together by a cement comprising a mixture of copal and castor oil dissolved in alcohol. This tape is applied so that successive layers overlap for about one-half the width of the tape, giving a two-layer insulation, the cloth-backing giving the necessary mechanical protection freedom from stretching and having other advantages as set forth more in detail in the McBride application.

Returning to the details of the armature and armature winding, it is noted that the armature must have an odd number of slots per pair of poles, preferably 8½ or even as low as 7½ slots per pole, although I may utilize as high as 10½ slots per pole. There should preferably be three commutator bars per slot, although I have utilized four. The number of bars per slot must be an exact multiple. It results, therefore, that the commutator must have between 45 and 22 bars per pole.

The minimum brush thickness (in a circumferential direction) which may be tolerated for mechanical reasons is at present about three-eighths of an inch, which, with a two-bar brush, gives a bar pitch of .188 inch. With a brush spanning more than two bars, the bar pitch may be reduced to a minimum value of .166 inch, which is the minimum width that can be tolerated with the necessary strength of the commutator. In each case, .032 mica is utilized between the bars, giving bar widths of .155 inch and .134 inch respectively.

Taking into consideration the possible range in the number of bars per pole and in the bar pitch of the commutator, it may be noted that the commutator periphery must be between about four and eight inches from the center of one pole to the center of the next. The rating per pound of active material (active iron and copper) is a maximum when the ratios of bars per slot and slots per pole are minimum.

The commutator of the particular motor illustrated is about twenty-seven inches in diameter. The armature radius must be between four and five inches greater than the commutator, and the radial depth of the stator punchings is between four and five inches.

Referring to Figs. 17 and 18, it will be noted that each coil, consisting of one turn, is connected to a separate commutator neck 161 and thence to a commutator bar 162.

The interpole shunt must be calculated in each case in accordance with the principles previously explained, and may have a wide range of values in different motors. To give some idea of the order of magnitudes involved, it is noted that the illustrated motor has an interpole shunt of .013 ohms reactance and .031 ohms resistance during high-speed conditions, and .004 ohms reactance and .031 ohms resistance at start. The high-speed shunt gives about 1400 amperes in the interpole, generating a quadrature-phase or transformer voltage of 2.7 volts per short-circuited coil at 765 R. P. M., during normal armature-current conditions of 1650 amperes. At the same time, the in-phase generated component is 4.5 volts per short-circuited coil.

Referring now to Fig. 1, it will be noted that the overload protection afforded by the circuit breakers 99, 100, 104 and 105 is different for the starting condition than for the running-speed condition. This may be accomplished in various ways. My preferred scheme, which is illustrated in the drawing and which is actually used, comprises a current transformer 164, the primary winding of which is connected in series with the coil of the current responsive relay 103, and the secondary winding of which is provided with two taps, either one of which is connected to the several tripping coils 165 of the circuit breakers. It will be understood that the two circuit breakers 99 and 104 in the circuit of the twin motor 27, 28 are controlled by the current in that motor circuit, and the two circuit breakers 100 and 105 in the circuit of the twin motor 29, 30 is controlled by the current in that motor circuit. The secondary taps of the current transformer 164, which are connected to the tripping coils 165, are controlled by means of two auxiliary contacts 166 on the field shunt relay 92, so that when the field shunt 52 is connected in service during the heavy-current starting period, the full number of secondary turns of the current transformer 164 is applied to the tripping coils 165, whereas, when the field relay 92 is deenergized, so as to remove the shunt 52 from the field, a smaller number of secondary turns of the current transformer 164 are applied to the tripping coils 165, so that the latter will trip at a lower value of the armature current.

It is necessary to have some sort of yielding driving connection between the several motors and the driving axles of the locomotive, and I have found that the most satisfactory results are obtained if these resilient connections are utilized for each of the motors. My motors are provided with a well known flexible quill drive and with spring pinions, the springs of the latter being indicated at 167 in Figs. 2 and 8. These devices are necessary in order to give each motor a little yielding so that it can start up and take its proper share of the load.

One feature of my invention is that I design my motors so that they will be interchangeable for either freight or passenger locomotives. This makes the design a little more difficult, but it is of obvious advantage both to the railroad and to the motor manufacturer, even though it makes the passenger motor slightly larger than would otherwise be necessary. The passenger locomotive has a gear ratio of 31:91 and the freight locomotive has a gear ratio of 21:101. Both locomotives are of standard gauge and of a normal wheel size of 72 inches or thereabout.

While I have illustrated my invention in a preferred embodiment in a passenger locomotive, it will be understood that my invention is not altogether limited thereto, but that it may be applied to motors for other purposes.

It is to be understood, also, that other means, than those shown, may be utilized for reducing or varying the phase of the main and interpole fields. Some of these other means will be the subjects of other applications. The means herein illustrated are those which are now in use.

While I have illustrated a motor utilizing a compensating winding, I do not desire to be limited solely to motors having such a winding.

To give some idea of the size of motor involved, it is noted that each of the four motors illustrated in the drawing has a normal continuous rating of 500 H. P. at 765 R. P. M., 275 volts, 25 cycles, 1650 amperes. This normal continuous rating is at 60% of the maximum speed and about 40% of the maximum tractive effort. It may be said that the motor has exceeded, in performance, this H. P. rating. The motor has such field strength as to give 2.74 megalines (maximum time-value) per pole at the continuous rated current of 1650 amperes with full field, and 2.6 megalines at a maximum starting current of 5000 amperes with shunted field.

By the use of my design, I obtain weights of between 18 and 23 pounds per H. P., as compared to 28 to 30 pounds per H. P. in previous designs of large alternating current commutator motors, and 35 pounds per H. P. in previous smaller motors of the same type. These weights include the motor bearings, gear case, quill caps and bearing caps, but do not include pinions, gears, quills or flexible drive.

It will be understood that the illustrated motor is more or less of a pioneer in a new design and that the above indicated weights and ratings will undoubtedly be improved in future motors involving further refinements of my design, such as a thinner insulation, better arrangement of the copper in the slots, better ventilation, better workmanship, and more juggling on the drawing board, such as clipping off the tips of the interpoles, grinding the teeth, changing the air gap, increasing the commutator speed, and other devices.

My herein described invention is set forth also in a paper entitled "Progress in the Design of Single-Phase Series Railway Motors", which I am giving at a Convention of the American Institute of Electrical Engineers at Louisville, Kentucky, on November 19, 1930.

I claim as my invention:

1. A single-phase series commutator motor comprising a field member and an armature member having an air gap therebetween, and means for producing a starting flux less than $70/f$ megalines per pole, where $f$ is the applied frequency in cycles per second, said air gap being greater than .12 inch.

2. A single-phase series commutator motor comprising a field member and an armature member having an air gap therebetween, means for producing a starting flux less than $70/f$ megalines per pole, where $f$ is the applied frequency in cycles per second, said air gap being greater than .12 inch, and a fractional-pitch armature winding which is chorded so that its coil-sides are less than one pole-pitch apart.

3. A series single-phase commutator motor comprising a field member and an armature member having an air gap therebetween, a main field winding in series with the armature, and an iron-core shunting reactor for said main field winding, said shunting reactor having a saturation curve which is flatter than said main field winding, the effect of the shunting reactor at all currents higher than continuous rating conditions being to keep down the flux to less than $70/f$ megalines per pole, where $f$ is the frequency in cycles per second, the air gap of the motor being at least .12 inch.

4. A single-phase series commutator motor comprising a field member and an armature member having an air-gap therebetween, and an exciting field winding for producing a normal-running-speed flux of approximately $65/f$ megalines per pole at the continuous-rating current, where $f$ is the applied frequency in cycles per second, said air gap being greater than .12 inch, in combination with control means including an iron-core shunting reactor and means for shunting said exciting field winding, at start, with said iron-core shunting reactor, said iron-core shunting reactor being of such value as to bring the maximum starting flux down to approximately $65/f$ megalines per pole at the maximum starting current.

5. A single-phase series commutator motor comprising a field member and an armature member having an air gap therebetween, means for producing a maximum starting flux of approximately $65/f$ megalines per pole, where $f$ is the applied frequency in cycles per second, said air gap being greater than .12 inch, carbon brushes each spanning between 2 and 3 bars, inclusive, and connections for securing a brush current density of approximately 150 amperes per square inch, obtained by dividing the maximum starting or accelerating current per brushholder by the total cross-sectional area of the brushes carried by each brushholder.

6. A single-phase series commutator motor comprising a field member and an armature member having an air gap therebetween, means for producing a maximum starting flux of approximately $65/f$ megalines per pole, where $f$ is the applied frequency in cycles per second, said air gap being greater than .12 inch, and a chorded armature winding having coil-sides less than one pole-pitch apart.

7. A single-phase series commutator motor and means for energizing and controlling the same, said motor having a multiple-wound armature with one turn between bars, and as many parallel paths as there are poles, and a field member spaced from said armature by an air gap greater than .12 inch and having an exciting field winding; said energizing and controlling means comprising a variable tap transformer, means for starting said motor on reduced voltage taps, tap-changing means for varying the applied voltage whereby the speed and tractive-effort of the motor may be controlled, an iron-core shunting reactor, and means for shunting the exciting field winding of said motor, at start, with said iron-core shunting reactor, said iron-core shunting reactor being of such value as to cause the maximum starting flux to be approximately $65/f$ megalines per pole at the maximum starting current, where $f$ is the applied frequency in cycles per second.

8. A standard single-phase series commutator motor interchangeable for high-speed passenger locomotives or lower-speed freight locomotives of standard gauge and normal wheel-size around 72 inches radius, said motor comprising a field member and an armature member having an air gap therebetween, said field member having a pole-number between 12 and 20 inclusive, a commutator of around 27 inches diameter, means for causing the motor to operate at a maximum commutator peripheral speed of at least 9000 feet per minute, said air gap being greater than .137 inch, said armature member having a multiple-wound, fractional-pitch, chorded armature winding with one turn between successive commutator bars and as many parallel paths as there are poles, the commutator having between 45 and 84 bars per pair of poles, and a whole number, between the limits of 3 and 4, times as many bars as there are slots in the armature, the armature having an odd number of slots per pair of poles, and means for starting the motor with such low main-field flux that the sparking volts at maximum starting current at standstill does not exceed about 2.9 volts between adjacent bars under the brushes.

9. A single-phase series commutator motor having a maximum commutator peripheral speed of at least 9000 feet per minute, a field member and an armature member having an air gap therebetween, said air gap being greater than .12 inch, having a multiple-wound, fractional-pitch, chorded armature winding with one turn between successive commutator bars and as many parallel paths as there are poles, the commutator having a whole number, between the limits of 3 and 4, times as many bars as there are slots in the armature, the armature having an odd number of slots per pair of poles, said odd number being between 15 and 21, and means for starting the motor with a main field flux less than $70/f$ megalines per pole at the maximum starting current, where $f$ is the frequency in cycles per second.

10. A single-phase series commutator motor comprising a field member and an armature member having an air gap therebetween, a commutator member having a plurality of commutator bars, said field member having a plurality of pairs of poles, a multiple-wound, fractional-pitch, chorded armature winding, with one turn between successive commutator bars and as many parallel paths as there are poles, said commutator bars being an exact multiple and about 3½ times as many as the number of slots, the number of slots being about eight times as many as the number of poles, there being an odd number of slots per pair of poles, the air gap being greater than .12 inch, means for producing a main field having a strength such that the flux is less than $70/f$ megalines per pole at the continuous-rating current, where $f$ is the frequency in cycles per second, means for so controlling the motor that the maximum starting current in the armature is between 2 and 3 times the continuous-rating current, and means operative when said maximum starting current is flowing for keeping down said flux to a value below $70/f$ megalines per pole.

11. A single-phase series commutator motor comprising a field member and an armature member having an air gap therebetween, a commutator member having a plurality of commutator bars, said field member having a plurality of pairs of poles, a multiple-wound armature winding with one turn between bars, and as many parallel paths as there are poles, said armature winding having a fractional pitch and being chorded so that its coil-sides are less than one pole-pitch apart, said armature having an odd number of slots per pair of poles, said armature having a radius greater than the commutator, the periphery of the commutator between the centers of two successive poles being between about 4 and 8 inches, the air gap being greater than .12 inch, and means for producing a main field having a strength such that the flux is less than $70/f$ megalines per pole at the continuous-rating current, where $f$ is the frequency in cycles per second.

12. A twin-motor unit comprising two single-phase series commutator motors having the hereinafter mentioned armatures and various field windings permanently connected together in the following order: the armature of the first motor, the compensating winding of the first motor, the interpole winding of the first motor, the interpole winding of the second motor, the compensating winding of the second motor, the armature of the second motor and finally the main field windings of the two motors, in combination with an interpole shunt across each of the two interpole windings, a main field shunt across the two main field windings, and means for controlling the shunts.

13. A twin-motor unit comprising two single-phase series commutator motors with armatures and various field windings permanently connected together in series, comprising interpole windings on the two motors electrically connected together adjacent to each other in the series circuit connection, field windings on the two motors electrically connected together adjacent to each other in the series circuit connection, with an interpole shunt across each of the two interpole windings, and with a main field shunt across the two main field windings, and means for controlling the shunts.

14. A series commutator multipolar single-phase motor having a main field winding on each pole, the main field windings being all connected in parallel to jointly form the main field winding of the motor, an interpole piece and an interpole winding between each pair of main poles, the interpole windings being all connected in parallel to jointly form the interpole winding of the motor, a multiple-wound, chorded, split-throw armature winding having at least one cross connection per armature slot.

15. In combination, a high-reactance main transformer, tap-changing means associated therewith, a plurality of single-phase, low-flux, large-air-gap series motors energized therefrom, by "low-flux" meaning less than approximately $80/f$ megalines per pole, where $f$ is the applied frequency in cycles per second, and by "large-air-gap" meaning greater than .12 inch, flexible driving connections between said motors and the driving shafts of the vehicle, means for at times reducing the effective main-field turns during the flow of starting current in the motors, and a master controller for controlling said tap-changing means.

16. In combination, a high-reactance main transformer, tap-changing means associated therewith, a plurality of single-phase, low-flux, large-air-gap series motors energized therefrom, by "low-flux" meaning less than approximately $80/f$ megalines per pole, where $f$ is the applied frequency in cycles per second, and by "large-air-gap" meaning greater than .12 inch, flexible driving connections between said motors and the driving shafts of the vehicle, a saturated iron-core series reactor of at least about 20% of the applied voltage, in series with each series motor circuit, means for cutting out said series reactor, means for at time reducing the effective main-field turns during the flow of starting currents in the motors, and a master controller for controlling said tap-changing means and said reactor cutting-out means.

17. The combination with a single-phase series motor having means for changing the effective turns of one of the stator field windings, of means for controlling said field-changing means, comprising an armature-voltage-responsive relay, an armature-current-responsive relay, means for increasing the effective turns of the aforesaid stator winding when the armature voltage exceeds a predetermined value and the armature current drops below a predetermined value, and means for locking in position said field-changing means when once so actuated.

18. A single-phase series motor comprising a multipole field member and an armature member having an air gap therebetween, means for producing a flux of less than $70/f$ megalines per pole at full main field and normal continuous-rating current, where $f$ is the frequency in cycles per second, said air gap being greater than .12 inch, means for reducing the effective turns of the main field winding, and means for controlling said field-reducing means, comprising an armature-voltage-responsive relay, an armature-current-responsive relay, means for increasing the effective turns of the aforesaid stator winding when the armature voltage exceeds a predetermined value and the armature current drops below a predetermined value, and means for locking in position said field-reducing means in off position when it is once so actuated.

19. A single-phase series motor comprising a multipole field member and an armature member having an air gap therebetween, means for producing a flux of less than $70/f$ megalines per pole at full main field and normal continuous-rating current, where $f$ is the frequency in cycles per second, said air gap being greater than .12 inch, means for reducing the effective turns of the main field winding, and means for actuating said field-reducing means to its off or ineffective position after the motor has attained considerable speed.

20. A single-phase series motor comprising a multipole field member and an armature member having an air gap therebetween, means for producing a flux of less than $70/f$ megalines per pole at full main field and normal continuous-rating current, where $f$ is the frequency in cycles per second, said air gap being greater than .12 inch, means for reducing the effective turns of the main field winding, means for actuating said field-reducing means to its off or ineffective position after the motor has attained considerable speed, excess-current circuit-interrupter means for said motor, current-responsive means for actuating said interrupter means, and means controlled by the actuation of said field-reducing means for varying the critical current to which said current-responsive means responds.

21. The comination with a single-phase series motor having a plurality of stator field windings, means for changing the effective turns of one of the stator field windings, of means for controlling said field-changing means, comprising an armature-voltage-responsive relay, an armature-current-responsive relay, means for increasing the effective turns of the aforesaid stator winding when the armature voltage exceeds a predetermined value and the armature current drops below a predetermined value, means for locking in position said field-changing means when once so actuated, excess-current circuit-interrupter means for said motor, current-responsive means for actuating said interrupter means, and means controlled by the actuation of said field-changing means for varying the critical current to which said current-responsive responds.

22. A low-flux, saturated-field, single-phase series motor having a flat-top saturation curve for its main field winding such as to limit the main field strength to not much more than $70/f$ megalines per pole under maximum current conditions, where $f$ is the frequency in cycles per second.

23. A low-flux single-phase, series motor having a main field winding, a compensating winding and an interpole winding, by "low-flux" meaning less than approximately $80/f$ megalines per pole, where $f$ is the applied frequency in cycles per second, said main and interpole windings lying in the bottom and top portions, respectively, of large slots defining main poles and interpoles, said compensating winding lying in smaller slots in the main pole faces, the tooth between each large slot and the adjacent small slot being narrow, whereby saturation occurs sooner than in the rest of the main pole.

24. A low-flux single-phase, series motor having a main field winding, a compensating winding and an interpole winding, by "low-flux" meaning less than approximately $80/f$ megalines per pole, where $f$ is the applied frequency in cycles per second, said main and interpole windings lying in the bottom and top portions, respectively, of large slots defining main poles and interpoles, said compensating winding lying in smaller slots in the main pole faces, the large slots being partially closed, whereby tooth tips are provided on the main poles, said tooth tips saturating before the rest of the magnetic circuit.

25. A low-flux, large-air-gap, single-phase, commutator motor, by "low-flux" meaning less than approximately $80/f$ megalines per pole, where $f$ is the applied frequency in cycles per second, and by "large-air-gap" meaning greater than .12 inch, said motor having main and interpole field windings, an interpole shunt for the latter, comprising resistance and reactance, means for accelerating the motor, the in-phase component of the interpole-winding current being such that the rotational voltage generated by the in-phase interpole flux in a short-circuited coil undergoing commutation is always substantially compensative of the inherent sparking voltage, the main field strength at starting being such that the transformer sparking voltage in each coil undergoing commutation does not exceed about 2.9 volts, the quadrature-related component of the interpole-winding current being such that the rotational voltage $e_t$ generated by the in-phase interpole flux in a short-circuited coil undergoing commutation is, in general, under—or over—compensative of the transformer sparking voltage $e_t'$, the algebraic sum of $e_t$ and $e_t'$ being no greater than 2.9 volts at any speed at which the interpole flux is effective.

26. A low-flux, large-air-gap, single-phase, commutator motor, by "low-flux" meaning less than approximately $80/f$ megalines per pole, where $f$ is the applied frequency in cycles per second, and by "large-air-gap" meaning greater than .12 inch, said motor having series main-field windings, an iron-core inductor, means for accelerating the motor, said means comprising a multi-tapped main transformer, an overload circuit breaker for the motor, and automatic means responsive to predetermined accelerating conditions of the motor for substantially simultaneously connecting said iron-core inductor in shunt to the main-field windings and increasing the current-setting of said overload circuit breaker.

HERBERT G. JUNGK.